UNITED STATES PATENT OFFICE.

WILHELM OSTWALD, OF LEIPZIG, GERMANY.

PROCESS OF RENDERING LITHOPONE MORE STABLE AGAINST LIGHT.

No. 916,004.　　　　　Specification of Letters Patent.　　　Patented March 23, 1909.

Application filed March 24, 1906. Serial No. 807,796.

*To all whom it may concern:*

Be it known that I, WILHELM OSTWALD, a subject of the King of Saxony, residing at 2/3 Linnéstrasse, Leipzig, Kingdom of Saxony, German Empire, have invented new and useful Improvements in Processes of Rendering Lithopone More Stable Against Light, of which the following is a specification.

Lithopone, a white pigment, is generally manufactured by treating sulfid of barium, obtained by the reduction of heavy spar or barytes for instance by means of coal, with solutions of zinc salts, preferably sulfate of zinc, but also of other zinc salts. The resulting mixture of sulfid of zinc and sulfate of barium is then dried, heated, chilled in water and when finely ground or pulverized constitutes the pigment. Besides very valuable properties, as its sanitary harmlessness and its stability against the action of sulfureted hydrogen, the lithopone has the disadvantage to be altered by the influence of the sun light. The pigment becomes gray by the action of the sun light.

The object of the present invention is to prevent this alteration and to manufacture a lithopone more stable against light than the kinds hitherto known.

I have found that the lithopone will be rendered more stable against light, if it has been treated with compounds which have no acid re-action and are able to precipitate zinc compounds from solutions of zinc compounds. Compounds of sodium or potassium are especially suitable for my purpose.

Of the compounds suitable for carrying out my invention the following may be mentioned as examples:—Carbonate of sodium or potassium, phosphates, pyrophosphates, metaphosphates, borates, cyanids, bicarbonates, ferrocyanids, sulfids, sulphydrids, hydroxids of the alkalies or mixtures of these compounds. Also the soluble in water salts of the earth alkali metals may be used. All these compounds may be utilized both separately and also mixed one with the other.

In order to carry out my invention I can mix the lithopone with the compounds to be added and use the mixture as a pigment. For instance I may mix 100 kilograms of dry lithopone with 3 kilograms of dry carbonate of sodium or 2.5 kilograms of phosphate of sodium ($Na_2HPO_4$ or $Na_3PO_4$). I can also use solutions of the compounds, incorporate the solutions to the lithopone and evaporate the solvent. I may also add the compounds and after a suitable time of action separate the salts by lixiviating with water. It is, however, not advisable to eliminate the total quantity of the added salt. I can also incorporate the same by chilling the heated mixture of sulfid of zinc and sulfate of barium with a solution of the said compound instead of water alone.

The proportion of the compounds used may be varied. Generally an amount of 1 to 3 per cent. of the lithopone will be suitable; I may however also use higher proportions of the compounds, but the quantity of the compounds must not be so high that the whole of the zinc sulfid present in the lithopone is converted into other zinc compounds. One skilled in the art will find by experiment the proportions suitable for his special purposes. The process may also be used for treating lithopone containing admixtures such as calcium compounds or the like.

What I claim and desire to secure by Letters Patent is:—

1. The process of rendering lithopone more stable against light, which consists in adding to lithopone manufactured in the known manner a metal compound soluble in water without decomposition, having no acid reaction, and being capable of precipitating zinc compounds from solutions of zinc salts.

2. The process of rendering lithopone more stable against light, which consists in adding to lithopone manufactured in the known manner a metal compound soluble in water without decomposition, having no acid reaction, and being capable of precipitating zinc compounds from solutions of zinc salts, and lixiviating the mixture.

3. The process of rendering lithopone more stable against light, which consists in chilling the hot lithopone manufactured in the known manner in a solution of a compound having no acid re-action and being able to precipitate zinc compounds from solutions of zinc salts.

4. The process of rendering lithopone more stable against light, which consists in adding an alkaline phosphate to lithopone manufactured in the known manner.

5. The process of rendering lithopone more stable against light, which consists in adding an alkaline phosphate to lithopone manufactured in the known manner and lixiviating the mixture.

6. The process of rendering lithopone more stable against light, which consists in chilling the hot lithopone manufactured in the known manner in a solution of an alkaline phosphate.

7. As a new article of manufacture, lithopone stable against light, containing a metal compound soluble in water without decomposition, having no acid reaction, and being capable of precipitating zinc compounds from solutions of zinc salts.

8. As a new article of manufacture, lithopone stable against light, containing an alkali phosphate.

In testimony whereof I have signed my name to this specification in the presence of two subscribing witnesses.

WILHELM OSTWALD.

Witnesses:
  RUDOLPH FRICKE,
  SOUTHARD P. WARNER.